(12) United States Patent
Purk

(10) Patent No.: US 7,440,771 B2
(45) Date of Patent: Oct. 21, 2008

(54) TRANSACTION CARD PROVIDING DISPLAYED INFORMATION

(75) Inventor: Gary Purk, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 323 days.

(21) Appl. No.: 10/376,885

(22) Filed: Feb. 28, 2003

(65) Prior Publication Data

US 2004/0171406 A1    Sep. 2, 2004

(51) Int. Cl.
*H04Q 7/20* (2006.01)
(52) U.S. Cl. .................... 455/556.1; 455/558
(58) Field of Classification Search ............ 455/405, 455/406, 407, 409, 557, 558, 550.1, 556.1; 340/4.4, 5.41, 5.62, 5.65, 5.66, 825.33, 825.34, 340/286.06, 311, 825.35; 235/379, 380, 235/383, 382, 382.5, 441, 486, 487, 492, 235/487.4; 705/7, 26, 39
See application file for complete search history.

(56) References Cited

U.S. PATENT DOCUMENTS

| | | | | |
|---|---|---|---|---|
| 4,837,422 | A * | 6/1989 | Dethloff et al. | 235/380 |
| 5,015,830 | A * | 5/1991 | Masuzawa et al. | 235/441 |
| 5,272,319 | A * | 12/1993 | Rey | 235/379 |
| 5,315,636 | A * | 5/1994 | Patel | 379/201.07 |
| 5,359,183 | A * | 10/1994 | Skodlar | 235/493 |
| 5,412,192 | A * | 5/1995 | Hoss | 235/380 |
| 5,679,939 | A * | 10/1997 | Watanabe | 235/379 |
| 5,748,737 | A * | 5/1998 | Daggar | 705/41 |
| 5,770,849 | A * | 6/1998 | Novis et al. | 235/492 |
| 5,777,903 | A * | 7/1998 | Piosenka et al. | 708/100 |
| 5,955,961 | A * | 9/1999 | Wallerstein | 340/5.4 |
| 6,068,183 | A * | 5/2000 | Freeman et al. | 235/375 |
| 6,360,954 | B1 * | 3/2002 | Barnardo | 235/492 |

(Continued)

FOREIGN PATENT DOCUMENTS

DE    19652092    6/1998

(Continued)

OTHER PUBLICATIONS

International Search Report for PCT/US2004/005910 dated Jul. 28, 2004.

*Primary Examiner*—Jean A Gelin
(74) *Attorney, Agent, or Firm*—Snell & Wilmer L.L.P.

(57) ABSTRACT

Transaction cards useful for making purchases of goods and/or services are provided having a display for showing information thereon. More specifically, the transaction cards of the present invention provide information directly on the face of the transaction card that is received via a wireless chip and/or antenna embedded within the transaction card. The transaction cards may be "stored-value" cards, credit cards, debit cards, or other transaction cards. In addition, the transaction cards may store information thereon within one or more magnetic stripes and/or within microchips embedded within the transaction card. The information relates to credit limit information or balance information. Alternatively, the information may be displayed on means for holding the transaction card, such as a slipcover. In addition, the information may be requested and displayed on a portable communication device, such as a cellular telephone, a pager, a personal digital assistant, a personal computing device, or other like devices.

22 Claims, 1 Drawing Sheet

U.S. PATENT DOCUMENTS

| | | | |
|---|---|---|---|
| 6,418,326 B1 * | 7/2002 | Heinonen et al. | 455/558 |
| 6,592,044 B1 | 7/2003 | Wong et al. | |
| 6,601,771 B2 * | 8/2003 | Charrin | 235/492 |
| 6,753,999 B2 | 6/2004 | Zehner et al. | |
| 6,758,404 B2 * | 7/2004 | Ladyansky | 235/492 |
| 6,799,721 B2 * | 10/2004 | Parrault | 235/383 |
| 7,306,143 B2 | 12/2007 | Bonneau, Jr. et al. | |
| 2002/0116330 A1 * | 8/2002 | Hed et al. | 705/39 |
| 2002/0128034 A1 | 9/2002 | Stone et al. | |
| 2005/0070334 A1 | 3/2005 | Ono et al. | |

FOREIGN PATENT DOCUMENTS

| | | |
|---|---|---|
| WO | WO 90/13096 A1 * | 11/1990 |
| WO | WO 99/59103 A1 * | 11/1999 |

* cited by examiner

TRANSACTION CARD PROVIDING DISPLAYED INFORMATION

FIELD OF THE INVENTION

Transaction cards useful for making purchases of goods and/or services are provided having a display for showing information thereon. More specifically, the transaction cards of the present invention provide information directly on either the front face or the back face of the transaction card. The information is received via a wireless chip and/or antenna embedded within the transaction card. The transaction cards may be "stored-value" cards, credit cards, debit cards, or other transaction cards. In addition, the transaction cards may have magnetic stripes or may be "smart cards", whereby the cards have embedded microchips. The information displayed on the transaction card relates to credit limit or balance information although any other information may be provided. In addition, the information may be requested and automatically displayed via e-mail or on a portable communication device, such as a cellular telephone, a pager, a personal digital assistant, a personal computing device, or other like devices.

BACKGROUND OF THE INVENTION

It is, of course, generally known to provide transaction cards useful for purchasing goods and/or services. For example, a customer who wishes to purchase a good or service may present a transaction card to a retailer. The transaction card may be a credit card, whereby an underwriter, such as a bank, for example, underwrites the purchase and the customer then owes the bank the amount of the purchase plus any interest that has accrued. In addition, the transaction card may be a debit card, whereby the amount of the purchase is directly withdrawn from the customer's account, such as a bank account or the like.

Recently, "stored-value" cards have increasingly become popular for conveniently purchasing goods and/or services. For example, an individual may purchase a stored-value card from an issuer and may add money to the stored value card. The stored-value card can then be used at the issuer or at any store able and/or willing to accept the stored-value card.

Typically, there are two types of stored-value cards: open system cards and closed system cards. An open system card is one that may typically be utilized at a number of different locations but has limited functionality. For example, a user may purchase an open system card from an issuer, and then utilize the open system card at any store able to accept the open system card. It is possible, to have open system cards that have restricted usage, in that they can only be utilized at a particular merchant or location. A closed system card is a stored-value card that is typically utilized at the place of issuance or typically at only one location or one merchant chain or a group of merchants in a cooperative arrangement. Specifically, a closed system transaction card may have specific programming that allows the closed system transaction card to have increased functionality. For example, information relating to balance information may be communicated to a user of a closed system transaction card at a point of sale. Currently, balance information cannot be provided to a user of an open system transaction card at a point of sale.

A stored-value card generally operates as follows. A purchaser buys a stored-value card from an issuer and pays an amount of cash, the amount or some portion of which is stored by the stored-value card. For example, a purchaser may wish to purchase a stored-value card so pays fifty dollars to the issuer. The issuer then issues a transaction card that represents the fifty dollars. The purchaser, or any other individual, may then utilize the stored-value card to purchase goods and/or services from the issuer and/or from any other merchant.

When a purchaser buys the transaction card, information is usually transmitted from the issuer, typically using an electronic card swiper or kiosk at a remote terminal or station, such as a point-of-sale ("POS") device, to a computer platform, which typically consists of a database for storing information relating to the transaction card. An initial "stored-value" amount (i.e. the amount that is initially purchased to be placed on the card) is transmitted from the remote terminal to the computer platform to fill the card. The computer platform then stores the amount of purchase.

When a stored-value card is utilized, the amount of the goods and/or services is entered into the card swiper or POS device and the card is then swiped or otherwise entered. A request is sent to the computer platform for removal of funds from the card. The computer platform then sends an approval to the card swiper or POS device and the database updates the new amount of funds contained on the card. The database may further communicate the balance of the card to the card swiper or POS device so that the balance may be communicated to the user of the card. This feature is typically only available for closed-system cards.

Transaction cards typically contain a magnetic stripe for storing information relating to the transaction cards, such as identifiers to uniquely identify the card, and for security purposes. Typically, information stored within the magnetic stripe may be a fifteen-digit card identifier number, a three to five digit card security code, and an expiration date. However, any information may be contained within the magnetic stripe. Data relating to personal information or balance information is not typically stored on the magnetic stripe. However, it is possible to store personal information and other information, such as an initial balance of the transaction card, within the magnetic stripe. Alternatively, the transaction card may have a computer chip for storing information, such as personal information, or other like information. These cards are well-known in the industry as "smart cards." When utilized, the merchant typically swipes the card using a POS device, and then retrieves balance information from the database, or otherwise receives approval for the purchase of the goods and/or services.

The difficulty with using a credit card, debit card or stored-value card as herein described is that the credit limit, account information, or remaining balance, respectively, on the card is often difficult to determine. For closed system cards, the amount contained on the card may typically be relayed to the user of the card at the point-of-sale or otherwise through use of the card, but can be easily forgotten. This can be true especially when many days, weeks or months pass before the card is used again. Moreover, it is even more difficult to obtain balance information for closed system cards, since balance information, or other information relating to the open system cards, is typically not provided at the point-of-sale.

Various ways to solve these problems have been proposed and some are currently in use. For example, a user of a credit card, debit card, stored-value card or the like can telephone a customer service representative or an "interactive voice response" system that can inform the user of the credit limit, account information, or balance on the credit card, debit card or stored-value card, respectively. Alternatively, a user of the transaction card can retrieve the information on-line by using a computer network, such as the Internet. However, this requires that an individual take the extra time to retrieve the information using a telephone or computer network. Moreover, the individual must take the time to retrieve the information each and every time the individual wishes to know the credit limit, account information, or balance on the card.

Moreover, a user of the transaction card may require account information or balance information and may not have access to a telephone or a computer to retrieve the information. An alternate way of retrieving account or balance information is to use a remote terminal or station, or otherwise request a salesperson at a remote terminal or station for assistance. Information may be retrieved by swiping the transaction card at a POS device. However, this requires time and energy by the user of the card to find a remote terminal that may be utilized for this purpose, and/or for a salesperson at the remote terminal to read the card and request the information.

In addition, a user of a transaction card may utilize the transaction card at restaurants, hotels, car rental agencies, or other establishments where the transaction card is typically "preauthorized" for an initial asking price or "overauthorized" for an amount over the initial asking price. For example, a transaction card can be preauthorized at a merchant prior to settling an invoice for an amount. If a user of the card, or the merchant, does not know the balance on the card, the card may be rejected if the preauthorization is for an amount greater than the balance of the card. When the preauthorization exceeds the limit or the balance, the card can get rejected and the user and the staff at the merchant may take more time to correctly process the transaction. Typically, this may involve contacting a customer service representative of the card issuer to correctly process the transaction. If the card user or the merchant knew the precise limit or balance on the card, the merchant could charge the balance of the card and the remaining amount the customer could then cover using cash, check or any other transaction card, such as a credit card, debit card, or other stored-value card.

A need, therefore, exists for a transaction card that provides real-time information relating to a credit limit, account information, balance, or other information, which aids a user in utilizing the transaction card. Moreover, a need exists for a transaction card that aids consumers and merchants in processing transactions via the transaction card quickly, efficiently and effectively.

SUMMARY OF THE INVENTION

The present invention relates to transaction cards useful for making purchases of goods and/or services having a display for showing information thereon. More specifically, the transaction cards of the present invention provide information directly on either the front face or the rear face of the transaction card. Typically, the transaction cards are "stored-value" cards, whereby an amount of currency may be purchased and "added" to the transaction card, such that the transaction card represents the amount purchased. In addition, credit cards may be utilized with the available credit limit displayed thereon, or a warning when the credit limit is approached. Further, debit cards may be utilized, with the account information, such as the account balance, displayed on the face of the transaction card. Of course, other types of transaction cards not described herein may be utilized with the present invention, and information relating to these transaction cards may be displayed on the transaction card.

It is, therefore, an objective of the present invention to provide a transaction card having a display for showing information thereon. The information may be related to credit limit information, balance information, or any other information useful to aid a user of the transaction card.

In addition, it is an objective of the present invention to provide a transaction card that provides real-time credit limit or balance information to a user of the card, so that the user is aware of the credit limit or balance of the card at any time.

Moreover, it is an objective of the present invention to decrease the amount of time that a user requires in determining the balance, or other information, on a transaction card. Further, an objective of the present invention is to increase the efficiency of a user of the card, and to free up a sales person at a remote terminal who may then be free to attend to customers.

Still further, it is an objective of the present invention to provide a transaction card having a wireless chip therein that is linked to a network for retrieving information for display on the face of the transaction card. In addition, it is an objective of the present invention to provide a transaction card having a display on a face of the transaction card, or on another portable device that can read the transaction card, and retrieve information from the wireless network. Moreover, it is an objective of the present invention to provide a transaction card having a display that may be powered utilizing solar energy, a stored battery, or other like energy means.

In addition, it is an objective of the present invention to provide a method of automatically obtaining information relating to a transaction. The information may be received via e-mail, telephone or other communication means, such as via a cellular telephone, pager, personal digital assistant, personal computer, and/or other like device.

Additional features and advantages of the present invention are described in, and will be apparent from, the detailed description of the present preferred embodiments and from the drawings.

DETAILED DESCRIPTION OF THE PRESENTLY PREFERRED EMBODIMENTS

The present invention relates to transaction cards useful for making purchases of goods and/or services and having a display for showing information thereon. More specifically, the transaction cards of the present invention provide information directly on the face of the transaction card on either the front or the back of the transaction card. Typically, the transaction cards are "stored-value" cards, whereby an amount of currency may be "added" to the transaction card, such that the transaction card represents the amount purchased. Typically, this involves storing the amount "added" to the transaction card on a database, and accessing the amount when the transaction card is utilized. A display on the transaction card shows the amount purchased and/or remaining on the transaction card.

In addition, credit cards may be utilized with the credit limit of each displayed thereon, or a warning when the credit limit is approached. Further, debit cards may be utilized, with the account information, such as the account balance, displayed on the face of the transaction card. Of course, other information may be displayed on the transaction cards besides balance or credit limit information.

Alternatively, the present invention relates to a method of receiving messages relating to credit limit or balance information for a transaction card, whereby the messages are received via a cellular telephone, or other portable communication device, such as a personal digital assistant or other personal computing device. A user of a transaction card may present to an issuer of the transaction card a telephone number or e-mail address, whereby a message, such as a text message or other message, may be automatically communicated to the user of the transaction card when the transaction card balance or other information changes or is otherwise updated or at any other time.

Figure 1:
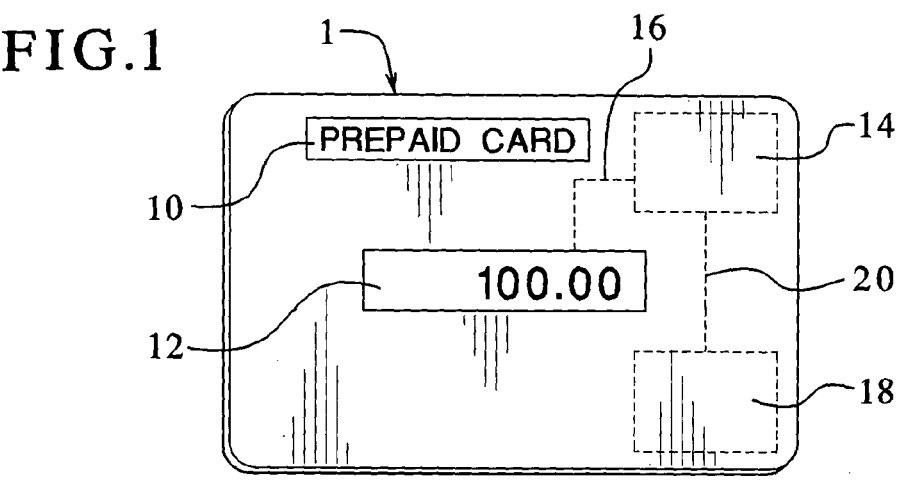
FIG. 1 illustrates a plan view of a transaction card having a wireless chip and digital display in an embodiment of the present invention.

Referring now to the figures, wherein like numerals refer to like parts, FIG. 1 illustrates a transaction card 1. The transaction card 1 may be made from rigid polymeric materials, such as plastic, and may be constructed of several layers, as is typical of transaction cards. Moreover, the transaction card 1 may have a printed indicia 10 contained thereon showing any information, such as an issuer of the transaction card, such as American Express, a bank, a store, or the like. Moreover, the printed indicia may include information relating to the type of transaction card that it is, such as a prepaid card (i.e. a stored-value card), a credit card, a debit card, or any other type of transaction card. Moreover, the printed indicia may include information relating to the issuing company or the merchant that is able to accept the transaction card for the purchase of goods and/or services. It should be apparent that any information may be printed on the transaction card 1 as may be apparent to one having ordinary skill in the art, and the invention should not be limited as herein described.

In addition, the transaction card 1 has a display 12 for displaying information within the display. For example, if the transaction card 1 is a stored-value card, then the balance of the stored-value card may be displayed within the display 12. Moreover, if the transaction card is a credit card, then the display may show the credit limit on the card, or how much money it would take to approach the credit limit. Alternatively, the display may simply indicate whether the user of the credit card is approaching the credit limit by continued use of the credit card. In addition, the transaction card may be a debit card, whereby account information, such as an account balance, may be displayed within the display and, therefore, on the face of the transaction card 1. Still further, any other information may be displayed within the display, and the invention should not be limited as herein described. For example, the display may show a text message indicating that the user of the transaction card should call a special number if a problem arises with an attempted transaction. Moreover, messages such as "void", "not active" or "needs maintenance" may be displayed.

A chip 14 may be embedded within the transaction card 1. The chip 14 may be embedded within layers of the transaction card 1 so that the chip 14 cannot easily be seen. Alternatively, the chip 14 may be on or near the surface of the transaction card 1 thereby providing a unique and distinctive look to the transaction card, alerting users of the card that the transaction card includes the chip 14. Still further, the chip 14 may be located within transparent layers of the transaction card 1 so that the chip 14 is well-protected, but easily viewable, thereby giving the transaction card a distinctive appearance.

Typically, the thickness of a transaction card is about 0.04 inches so that the transaction card can be swiped through a POS device. It is preferable that the transaction card having the chip 14 and the display 12, as well as the power means (see below) maintain a thickness of about 0.04 inches so that the transaction card of the present invention can be swiped in a POS device. However, other transaction cards of varying thicknesses are contemplated by the present invention, and the transaction cards are not meant to be limited as herein described.

The chip 14 is a wireless chip that can receive signals sent to the chip 14 from an external source. For example, the chip 14 may receive signals from a wireless network, such as a cellular phone network, or other wireless network able to send signals to the chip 14. Alternatively, the chip 14 may be interconnected with an antenna (not shown) that may aid the chip 14 in retrieving the information.

The chip 14 and/or the antenna may receive the signals and display information within the display 12 via a display connection 16. The display connection 16 may be an electrical wire or a plurality of electrical wires that completes an electrical circuit thereby providing an electrical linkage between the chip 14 and the display 12. Alternatively, the display 12 may be connected directly to the chip 14 without the use of a wire or wires. For example, the chip 14 may include a coupling means whereby a portion of the display 12 is coupled to the chip 14 via the coupling means, whereby the coupling means includes electrical connections that match electrical connections on the display 12. Of course, any other connection means connecting the chip 14 to the display 12 may be utilized by the present invention, and the present invention is not meant to be limited as herein described. The information sent from the chip 14 to the display and displayed by the display is described in more detail as provided below.

The chip 14 may be powered by a power means 18, which may be a battery, solar cell or photo cell, or other power means that may provide electrical power to the chip 14 for displaying information on the display 12. For example, a small battery may be disposed within the layers of the transaction card and may further be interconnected with the chip 14 and the display 12. In addition, the power means 18 may be a solar or photocell, whereby sunlight, lamplight, or any other light source may be utilized to provide electrical power to the chip 14 and/or the display 12. Regardless of the means utilized to power the chip 14 and/or the display 12, the power means 18 may be connected to the chip 14 via an electrical connection 20. Ultimately, the power means 18 may be connected to the display 12 via the display connection 16.

Alternatively, the transaction card may include a circuit having two circuit connection areas whereby a circuit, interconnected with a battery or other power means, may be completed when a user touches the two circuit connection areas on the transaction card, thereby completing the circuit. The display 12 may then activate and show the information. Alternatively, the circuit may be completed when a small switch is toggled on the transaction card. Although the power means 18 is shown in a specific location pursuant to FIG. 1, it should be noted that the power means 18 may be located in or on the transaction card 1 in any location, and should not be limited as herein represented in FIG. 1.

The display 12, the chip 14, the display connection 16, the power means 18, and/or the electrical connection 20 may be provided on a circuit board that may be disposed on or within the transaction card. The circuit board may be hidden within the layers of the transaction card or may be visible on a surface of the transaction card to give the transaction card a distinctive appearance. Of course, regardless of whether the circuit board is visible, the display 12 must be visible to a user of the transaction card.

The information provided to the wireless chip 14 from the wireless network may, for example, include credit limit information if the transaction card 1 is a credit card. For example, the information displayed on the card 1 may be an amount of money available before the user is restricted by the credit limit. Alternatively, the information may be a total amount of credit accrued through use of the card 1. Also, the information may simply be a message that indicates that the user is approaching the credit limit of the card 1 without displaying an actual amount of money on the transaction card 1.

Alternatively, the information provided to the chip 14 and displayed on the display 12 may be information relating to balance information, if the transaction card 1 is a stored-value card, thereby representing how much currency can be removed from the transaction card 1 to purchase goods and/or services. In addition, the information provided to the chip 14 and displayed on the display 12 may be balance information if the transaction card 1 is a debit card, thereby representing how much money is currently available from a bank account or other like account.

Of course, the information provided on the transaction card 1 may be any information useful to be communicated to the user of the transaction card 1, and should not be limited in any way as herein described. For example, the information may be numerical, such as the balance information, or may be text, such as error messages or the like. In addition, messages may be relayed to a user of the transaction card via a speaker (not shown) so that the message may be aurally heard. It should be noted that any method of communicating the message to a user of the card is contemplated by the present invention.

The transaction card 1 may be activated via a switch, button, or any other means that may cause the power means 18 to activate the chip 14 to receive the information displayed on the display 12. Of course, the transaction card 1 may remain activated at all times such that the display constantly displays the information in real-time. Alternatively, the chip 14 and the display 12 may be activated when sunlight or artificial light shines upon a solar cell or a photocell. As noted above, the transaction card may be activated by completing a circuit via toggle switch or by touching two circuit connection areas on the transaction card (not shown). A circuit, interconnected with the power means 18, would then be completed, thereby activating the chip 14 and the display 12.

Figure 2:
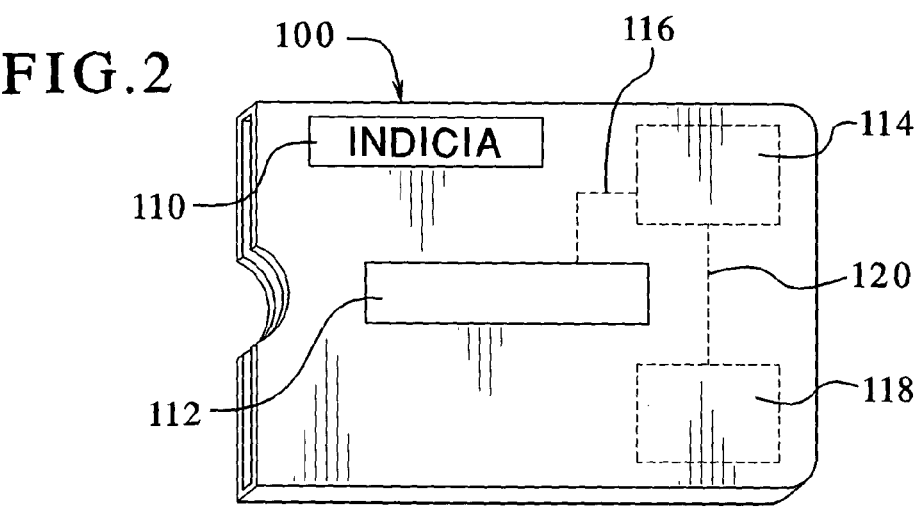
FIG. 2 illustrates a plan view of a slipcover for a transaction card wherein said slipcover has a wireless chip and digital display in an alternate embodiment of the present invention.
Figure 3:
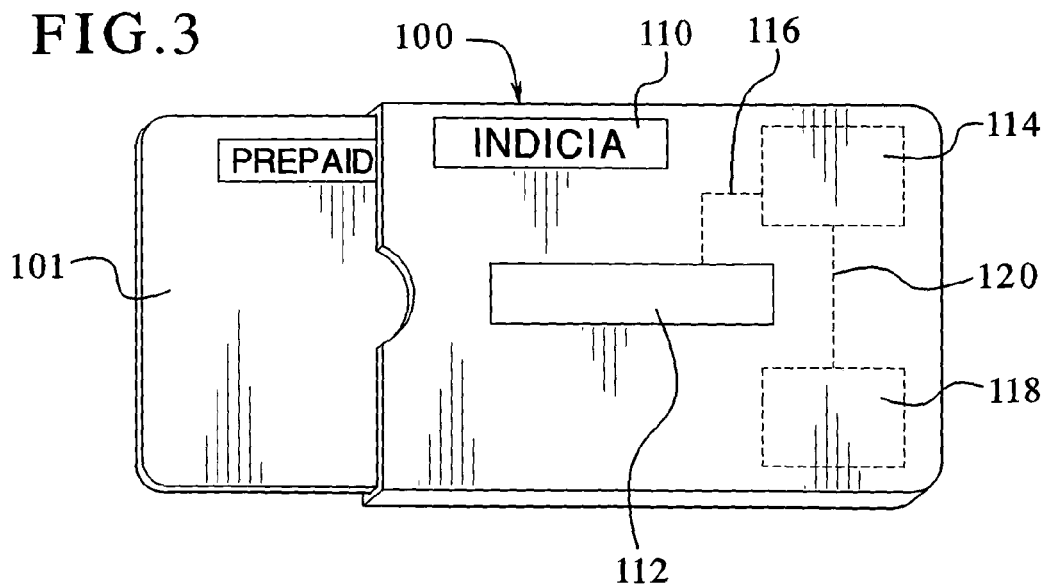
FIG. 3 illustrates a plan view of a transaction card and slipcover in combination in an embodiment of the present invention.

FIG. 2 illustrates an alternate embodiment of the present invention. The transaction card may be housed within a housing that displays the information. Specifically, the housing may be a slipcover 100 that may have the function of the transaction card 1 as described above with reference to FIG. 1. Specifically, the transaction card slipcover 100 may include indicia 110 that may be permanently printed onto the slip cover 100. In addition, the slip cover 100 may have an electronic display 112 for showing information relating to a transaction card 101 that may be inserted into the slip cover 100, as illustrated in FIG. 3. The slipcover may further have a chip 114 that is connected to the display 112 via a display connection 116. In addition, a power source 118 may be provided that may be connected to the chip 114 and, hence, to the display 112 via an electrical connection 120. The display 112, the chip 114, the display connection 116, the power means 118 and the electrical connection 120 may be provided on a circuit board and/or may function the same or similarly to the respective parts of the transaction card 1 as illustrated in FIG. 1.

The slip cover 100 may further have a mechanism for reading the information from the transaction card 101, such as a magnetic card reader or the like so that the slip cover 100 can recognize the particular card and send the information relating to the transaction card 101 and retrieve the specific information relating to the transaction card 101. The slip cover 100 may be designed such that a plurality of different transaction cards may be inserted one-at-a-time into the slip cover 100 and the specific information relating to each transaction card may be displayed on the display 112. Alternatively, the slipcover 100 may be specially made and unique for an individual transaction card. Regardless, a user who wants to check the balance on the transaction card 101 or retrieve any other information that may be provided slips the transaction card 101 into the slipcover 100. The slipcover 100 would then be activated via a switch, button, or other activating means (not shown). Also, the slipcover 100 may be activated via a solar cell or a photocell when sunlight or artificial light shines upon the solar cell or photocell. In addition, if the power means 118 is a battery, the slipcover 100 may be activated when a connection is linked by a person holding their fingers on two circuit connection areas (not shown) on the slipcover 100 such that the fingers complete the circuit leading from the power means 118 to the chip 114 and ultimately the display 112. Alternatively, the slipcover 100 may be automatically activated when the transaction card 101 is slipped into the slipcover 100.

To utilize the transaction card 1 as a stored-value card, or the slipcover 100 with transaction card 101 as a stored-value card system, as described above with respect to FIGS. 1-3, a customer may purchase a stored-value card or stored-value card system, including a transaction card and a slipcover, as described above with respect to FIGS. 1-3. For example, a customer may order the transaction card via the Internet, telephone, or other ordering means. Alternatively, the customer may purchase the transaction card from a direct source, such as via a merchant or other "brick-and-mortar" establishment, such as via a post-office, grocery store, bank or other establishment. The transaction card may be an open-system stored-value card or a closed system stored-value card, as described above.

The customer purchases the transaction card by paying a specific amount of money. For example, the customer may purchase the transaction card by paying one hundred dollars to the establishment. In exchange, the establishment issues the stored-value card to the customer and sends a communication to a computer platform that records that an amount of money has been added to the stored-value card. In addition, by contacting the computer platform, the transaction card may be activated. Alternatively, the transaction card may be activated by the customer upon receiving the transaction card via telephone or the Internet, or other computer network.

The computer platform sends a wireless signal through a wireless network, such as via a cellular telephone network, or other network, to the transaction card or the slipcover, which then displays "$100.00" on the display contained on or within the transaction card or slipcover having a display disposed thereon or therein.

The customer may then utilize the transaction card at any establishment that accepts the transaction card for the purchase of goods and services. The customer then presents the transaction card at checkout to purchase the goods and/or services. The transaction card is then read via a POS device, such as a magnetic stripe reader. However, other data recording means for storing data may be utilized on the transaction card of the present invention, including microchips and the like. The data recording means, as noted above, typically contains information uniquely identifying the card. The data is then decoded by the POS reader and the information is sent to the computer platform, which retrieves information from a database relating to the transaction card, especially the balance contained on the transaction card. The computer platform either authorizes or rejects the purchase of the goods and/or services based on whether the amount of money necessary to purchase the goods and/or services is contained on the transaction card. Since a customer will immediately know the amount of the money on the transaction card, a rejection should not be necessary.

Alternatively, the customer may check the display on the transaction card or slip cover to determine the amount of money contained on the transaction card and request that only that amount of money be presented to the computer platform for authorization. Further, the merchant may check the display on the transaction card or slipcover for the amount of money contained on the transaction card and only enter that amount of money for authorization.

Once the card has been authorized, the amount entered for authorization, typically the purchase price of the goods and/or services, is subtracted from the total amount of money on the transaction card and thereby stored in the database. The computer platform then sends a communication to the transaction card, and the new amount is then displayed on the transaction card. For example, if a good or service costing $42.38 is purchased via the transaction card having $100 stored thereon, then $42.38 is subtracted from the $100 amount to give a new amount of $57.62. The new amount of $57.62 is then displayed on the transaction card or the slipcover.

The customer may continue to utilize the transaction card until all of the money represented as being contained on the transaction card has been removed from the transaction card. Alternatively, the customer may add money to the transaction card. In addition, other individuals may send money to the customer by requesting that money be added to the customer's transaction card. For example, an individual may telephone or otherwise contact an issuer of the transaction card to inform the issuer that money should be added to the customer's transaction card. Alternatively, a first individual having a first transaction card may contact the issuer of the first transaction card to request that money be removed from the first transaction card and transferred to a second transaction card owned by a second individual.

In an alternate embodiment of the present invention, a user of a transaction card may receive messages directly onto a portable communication device, such as a cellular telephone, pager, personal digital assistant or other personal computer device. When the transaction card is utilized, the balance information is automatically communicated to the user of the transaction card via a message that is sent to the user via the unique telephone number, pager number, e-mail address or the like.

For example, the portable communication device may be a cellular telephone, whereby the individual communicates with the issuer of the transaction card and informs the issuer of the cellular telephone's number. The issuer may receive the cellular telephone number from the individual and send the telephone number to a computer platform containing a database for storing information relating to the transaction card. The computer platform may store the telephone until the transaction card is used. When the transaction card is used, the updated balance information is sent via a cellular telephone tower or other cellular communication means to the user of the transaction card via the telephone number that is stored in the computer platform. The signal may be a text message, a verbal message, a graphical message, or some other type of message. The individual then receives the message, which informs the individual of the credit limit or balance information. Of course, security features may further be included so that others may not gain access to information relating to an individual's credit limit and/or balance information relating to the individual's transaction card or cards.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A stored value transaction card comprising:
   a magnetic stripe;
   a wireless chip integrated within the stored value transaction card for receiving wireless information from a database separate from the transaction card wherein the wireless information is based upon a purchase transaction, and wherein the wireless information comprises an account balance remaining associated with a stored value transaction account associated with the stored value transaction card;
   a display coupled to the wireless chip and disposed as a screen on a surface of the transaction card for displaying the account balance remaining received by the wireless chip; and
   a switch on the surface of the transaction card, the switch configured to activate the wireless chip to receive the account balance remaining and to cause the account balance remaining to show on the display on the surface of the transaction card,
   wherein said stored value transaction card is configured to be read by a card reader.

2. The transaction card system of claim 1 further comprising:
   means for powering the wireless chip and the display.

3. The transaction card of claim 2 wherein said means for powering comprising a battery.

4. The transaction card system of claim 2 wherein said means for powering comprises at least one of a solar cell and a photocell.

5. The transaction card system of claim 1 futher comprising;
   an antenna interconnected with the wireless chip for receiving information.

6. The system of claim 1, futher comprising a portable housing for holding the transaction.

7. The system of claim 6, wherein the portable housing further comprises an aperture which enables viewing of the display.

8. The system of claim 6, wherein the portable housing further comprises a second display configured to communicate with the transaction card.

9. The system of claim 8, wherein the portable housing further comprises a second wireless chip configured to communicate with the transaction card.

10. The system of claim 1, wherein the wireless chip is further configured for receiving wireless information via a local wireless network at a merchant location.

11. A credit transaction card comprising:
    a magnetic stripe;
    a wireless chip integrated within the credit transaction card for receiving wireless information from a database separate from the credit transaction card wherein the wireless information is based upon a purchase transaction, and wherein the wireless information comprises a credit limit associated with a credit account associated with credit transaction card;

a display coupled to the wireless chip and disposed as a screen on a surface of the transaction card for displaying the credit limit received by the wireless chip; and a switch on the surface of the transaction card, the switch configured to activate the wireless chip to receive the credit limit and to cause the credit limit to show on the display on the surface of the transaction card, wherein said credit transaction card is configured to be read by a card reader.

12. The system of claim 11 futher comprising a portable housing for holding the credit transaction card.

13. The system of claim 12, wherein the portable housing further comprising an aperture which enables viewing of the display.

14. The system of claim 12, wherein the portable housing further comprises a second display configured to communicate with the transaction card.

15. The system of claim 12, wherein the portable housing further comprises a second wireless chip configured to communicate with the transaction card.

16. The system of claim 11, wherein the wireless chip is further configured for receiving wireless information via a local wireless network at a merchant location 17. A method of using a stored value transaction card comprising the steps of:

displaying an account balance remaining associated with a stored value transaction account;

sending a purchase request to a computer platform via a card reader, wherein the purchase request includes a payment amount and authorization information related to the stored value transaction account;

obtaining authorization for the purchase request from the computer platform based on the payment amount and the account balance remaining;

receiving a communication from the computer platform wherein said communication comprises an updated account balance remaining which is based upon the payment amount; and displaying the updated account balance remaining, wherein the stored value transaction card comprises a magnetic stripe;

a wireless chip integrated within the stored value transaction card for receiving wireless information wherein the wireless information is based upon the purchase transaction, wherein the wireless information comprises the account balance remaining associated with the stored value transaction account associated with the stored value transaction card;

a display coupled to the wireless chip disposed as a screen on a surface of said stored value transaction card for displaying the account balance remaining received by the wireless chip, a switch on the surface of the transaction card, the switch configured to activate the wireless chip to receive the account balance remaining and to cause the account balance remaining to show on the display on the surface of the transaction card, and wherein said stored value transaction card is configured to be read by a card reader.

18. The method of claim 17, wherein the step of providing the transaction card system further comprises providing a portable housing for holding the transaction card.

19. The transaction card system of claim 14 wherein said transaction card is a stored-value card and said information relates to balance information for said stored-value card.

20. The method of claim 18, wherein the portable housing further comprises providing a second display configured to communicate with the transaction card.

21. The method of claim 18, wherein the portable housing further comprises a second wireless chip configured to communicate with the transaction card.

22. The method of claim 17, wherein the portable housing further comprises a second wireless chip configured to communicate with the transaction card.

* * * * *

UNITED STATES PATENT AND TRADEMARK OFFICE
CERTIFICATE OF CORRECTION

PATENT NO. : 7,440,771 B2  Page 1 of 1
APPLICATION NO. : 10/376885
DATED : October 21, 2008
INVENTOR(S) : Purk et al.

It is certified that error appears in the above-identified patent and that said Letters Patent is hereby corrected as shown below:

Col. 12, line 25, please delete claim 19 and insert the following therefor:

--19. The method of claim 18, wherein the portable housing further comprises an aperture configured in the portable housing.--

Col. 12, line 34, please delete claim 22 and insert the following therefor:

--22. The method of claim 17, wherein the wireless chip is further configured for receiving wireless information via a local wireless network at a merchant location.--

Signed and Sealed this

Twentieth Day of January, 2009

JON W. DUDAS
*Director of the United States Patent and Trademark Office*